United States Patent
Ishii

(10) Patent No.: US 8,466,992 B2
(45) Date of Patent: Jun. 18, 2013

(54) IMAGE PROCESSING APPARATUS, IMAGE PROCESSING METHOD, AND PROGRAM

(75) Inventor: Hirokazu Ishii, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/513,003

(22) PCT Filed: Dec. 3, 2010

(86) PCT No.: PCT/JP2010/007053
§ 371 (c)(1),
(2), (4) Date: May 31, 2012

(87) PCT Pub. No.: WO2011/070754
PCT Pub. Date: Jun. 16, 2011

(65) Prior Publication Data
US 2012/0236185 A1    Sep. 20, 2012

(30) Foreign Application Priority Data

Dec. 9, 2009    (JP) ................................. 2009-279528

(51) Int. Cl.
    H04N 9/64    (2006.01)
(52) U.S. Cl.
    USPC ............................. 348/246; 348/345; 348/349
(58) Field of Classification Search
    USPC .......................................... 348/246, 349, 345
    See application file for complete search history.

(56) References Cited

U.S. PATENT DOCUMENTS

| | | | |
|---|---|---|---|
| 6,781,632 B1* | 8/2004 | Ide | 348/345 |
| 7,924,342 B2* | 4/2011 | Kusaka | 348/345 |
| 8,149,324 B2* | 4/2012 | Oikawa | 348/349 |
| 2005/0041116 A1* | 2/2005 | Tsukioka | 348/229.1 |
| 2007/0206940 A1* | 9/2007 | Kusaka | 396/128 |
| 2009/0207264 A1* | 8/2009 | Utsugi | 348/222.1 |
| 2009/0225217 A1* | 9/2009 | Katsuda et al. | 348/366 |
| 2011/0063484 A1* | 3/2011 | Fujii et al. | 348/294 |
| 2011/0273581 A1* | 11/2011 | Fujii et al. | 348/222.1 |

FOREIGN PATENT DOCUMENTS

| | | |
|---|---|---|
| EP | 2091260 A2 | 8/2009 |
| JP | 2000-156823 A | 6/2000 |
| JP | 2002-27325 A | 1/2002 |
| JP | 2007-258860 A | 10/2007 |
| JP | 2007-279597 A | 10/2007 |
| JP | 2007-282108 A | 10/2007 |
| JP | 2009-44636 A | 2/2009 |
| JP | 2009-44638 A | 2/2009 |

* cited by examiner

*Primary Examiner* — Aung S Moe
*Assistant Examiner* — Amy Hsu
(74) *Attorney, Agent, or Firm* — Carter, DeLuca, Farrell & Schmidt LLP

(57) ABSTRACT

An image processing apparatus for processing an output of an image pickup element having ordinary pixels arranged in a horizontal direction and a vertical direction and functional pixels arranged discretely between the ordinary pixels, is arranged to estimate an image signal at a position of the functional pixel by a gain correction operation of outputs of the functional pixels, estimate an output of the image signal at the position of the functional pixel on the basis of outputs of reference pixels selected from the ordinary pixels around the functional pixel, and select the image signal at the position of the functional pixel on the basis of an estimation result by the gain correction from one or a plurality of estimation results obtained using the reference pixels.

14 Claims, 15 Drawing Sheets

Fig. 12

| G2' | R | G1 | R | G |
|-----|---|----|---|---|
| B | G2 | B | G3 | B |
| G4 | R | AFG | R | G5 |
| B | G6 | B | G7 | B |
| G | R | G8 | R | G |

| G | R | G1 | R | G |
|---|---|----|---|---|
| B | G2 | B | G3 | B |
| AFG 1 | R | AFG 2 | R | AFG 3 |
| B | G6 | B | G7 | B |
| G | R | G8 | R | G |

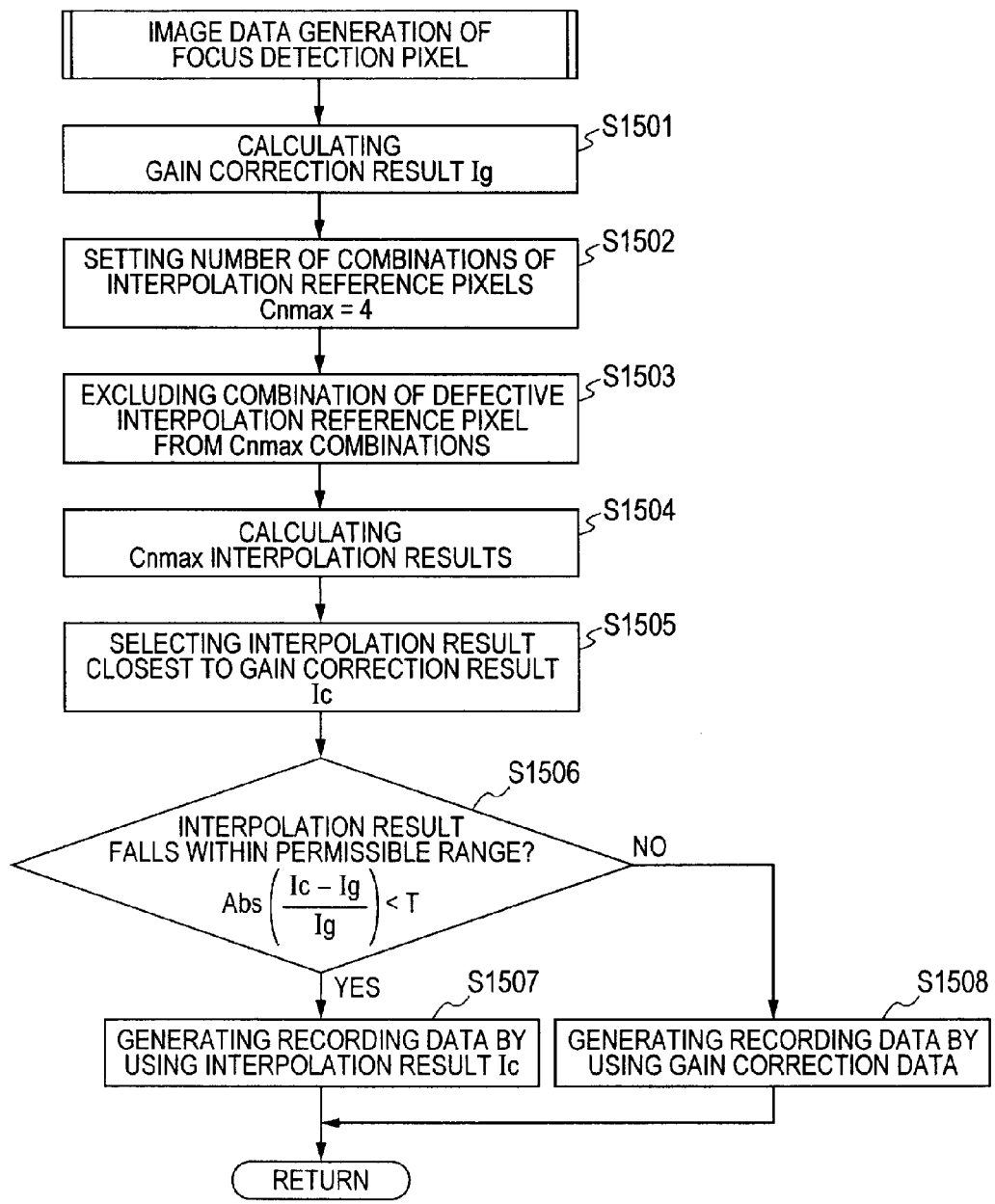

IMAGE PROCESSING APPARATUS, IMAGE PROCESSING METHOD, AND PROGRAM

TECHNICAL FIELD

The invention relates to an image pickup apparatus having a functional pixel having a specific function as a part of pixels constructing an image pickup element such as digital camera, video camera, or the like and, more particularly, to an image processing apparatus for executing an image processing on the basis of an output from the image pickup element.

BACKGROUND ART

As an example of an image pickup element having a functional pixel having a specific function as a part of pixels constructing the image pickup element, such a technique that a phase difference detecting function of an object image is added to the image pickup element, so that a dedicated AF (autofocus) sensor is made unnecessary and a high-speed phase difference AF is realized, has been disclosed.

For example, in the Official Gazette of PTL1, in a light receiving element (pixels) as a part of an image pickup element, a pupil dividing function is attained by deviating a sensitive area of a light receiving portion for an optical axis of an on-chip micro lens. Those pixels are used as focus detection pixels and arranged between image pickup pixels at a predetermined interval, thereby performing a phase difference type focus detection. Since the portion where the focus detection pixels have been arranged corresponds to a defective area of the image pickup pixels, image information of the focus detection pixels is formed by interpolation using image pickup pixel information around the focus detection pixel.

In the Official Gazette of PTL2, a unit for forming image information at a position of focus detection pixels has: a generation unit for generating image data from the image information of the focus detection pixels by gain correction; a generation unit for generating image information from information of image pickup pixels around the focus detection pixels by interpolation; and a frequency component detection unit for detecting a spatial frequency component of an object image, wherein those generation units are switched in accordance with the detected spatial frequency component.

However, the foregoing conventional techniques have the following problems.

As disclosed in PTL1, if an image signal of the focus detection pixel is interpolated on the basis of image signals of pixels around the focus detection pixel, as for image data which is obtained from those peripheral pixels, there is a possibility that a value which is fairly away from an output of the image pickup pixel which ought to have inherently existed at its position is calculated.

In the case of receiving light of an object of a low spatial frequency, an image at the position of the focus detection pixel has a high continuity for an image at the position of pixels only for image pickup, arranged around the focus detection pixel. Therefore, it is desirable to interpolate the image data at the position of the focus detection pixel on the basis of the image signals of the peripheral pixels. In this case, since the spatial frequency of the object image is low, a deterioration in sharpness caused by the interpolation processing is inconspicuous.

In the case of receiving light of an object of a high spatial frequency, since an image at the position of the focus detection pixel has a less continuity for the image at the position of the pixels only for image pickup, arranged around the focus detection pixel, a result of the interpolation processing differs largely depending on a selection of interpolation reference pixels.

In the case of receiving light of an object in which the continuity of the image is low in a specific direction, it is desirable that the pixels only for image pickup arranged in the direction in which the continuity of the image is high for the position of the focus detection pixel are selected as interpolation reference pixels. For an image in which the continuity of the image is low in all directions, it is difficult to estimate the image signal at the position of the focus detection pixel from the image signals of the peripheral pixels.

According to the conventional technique disclosed in PTL2, in the case of receiving light of an object of a high spatial frequency, image information at the position of the focus detection pixel is formed from image information of the focus detection pixel by the gain correction. If the image signal is formed from the output signal of the focus detection pixel by the gain correction, the image signal which does not relatively depend on the object can be formed. However, if layout density of arrangement of the focus detection pixels is set to be high, a possibility that an image which is obtained in the area where the focus detection pixels are arranged appears to be noiseful is high. In the case of interpolating from the pixels only for image pickup around the focus detection pixel, although the image does not appear to be so noiseful, in order to obtain a good image, it is required to correctly select the interpolation reference pixels.

CITATION LIST

Patent Literature

PTL1: Japanese Patent Application Laid-Open No. 2000-156823
PTL2: Japanese Patent Application Laid-Open No. 2009-44636

SUMMARY OF INVENTION

Technical Problem

It is an aspect of the invention to provide an image processing apparatus which can reduce a deterioration in image quality that is caused by a generation of image data at a position of a focus detection pixel.

Solution to Problem

According to an aspect of the invention, an image processing apparatus of the present invention comprises: an input unit configured to input an output of an image pickup element having ordinary pixels arranged in a horizontal direction and a vertical direction and functional pixels arranged discretely between the ordinary pixels; a first estimating unit configured to perform a gain correction operation to outputs of the functional pixels, thereby estimating an image signal at a position of the functional pixel; a second estimating unit configured to select reference pixels from the ordinary pixels around the functional pixel and estimate an output of the image signal at the position of the functional pixel on the basis of outputs of a plurality of selected reference pixels; and a selecting unit configured to select the image signal at the position of the functional pixel on the basis of an output of the first estimating unit from one or a plurality of estimation results which are obtained by the second estimating unit on the basis of combinations of the plurality of reference pixels.

Advantageous Effects of Invention

According to the invention, in order to generate the image signal at the position of the focus detection pixel, a plurality of pixels which are to be referred to in the interpolation processing can be selected on the basis of the image signal generated by the gain correction processing which does not relatively depend on the object. Therefore, the deterioration in image quality due to the image signal generated by the interpolation processing can be reduced.

Further features and aspects of the present invention will become apparent from the following description of exemplary embodiments with reference to the attached drawings.

BRIEF DESCRIPTION OF DRAWINGS

FIG. 12 is a layout diagram of pixels around the focus detection pixel according to the embodiment of the invention.

FIG. 13 is a diagram illustrating a layout pattern of focus detection pixels according to a modification of the embodiment of the invention.

FIG. 14 is a diagram illustrating a layout pattern of pixels around the focus detection pixel according to the modification of the embodiment of the invention.

FIG. 15 is a flowchart illustrating the image processing operation according to the modification of the embodiment of the invention.

DESCRIPTION OF EMBODIMENTS

Exemplary embodiments of the present invention will be described in detail in accordance with the accompanying drawings.

Embodiment

The embodiment of the invention will be described hereinbelow with reference to the drawings.

Figure 1:
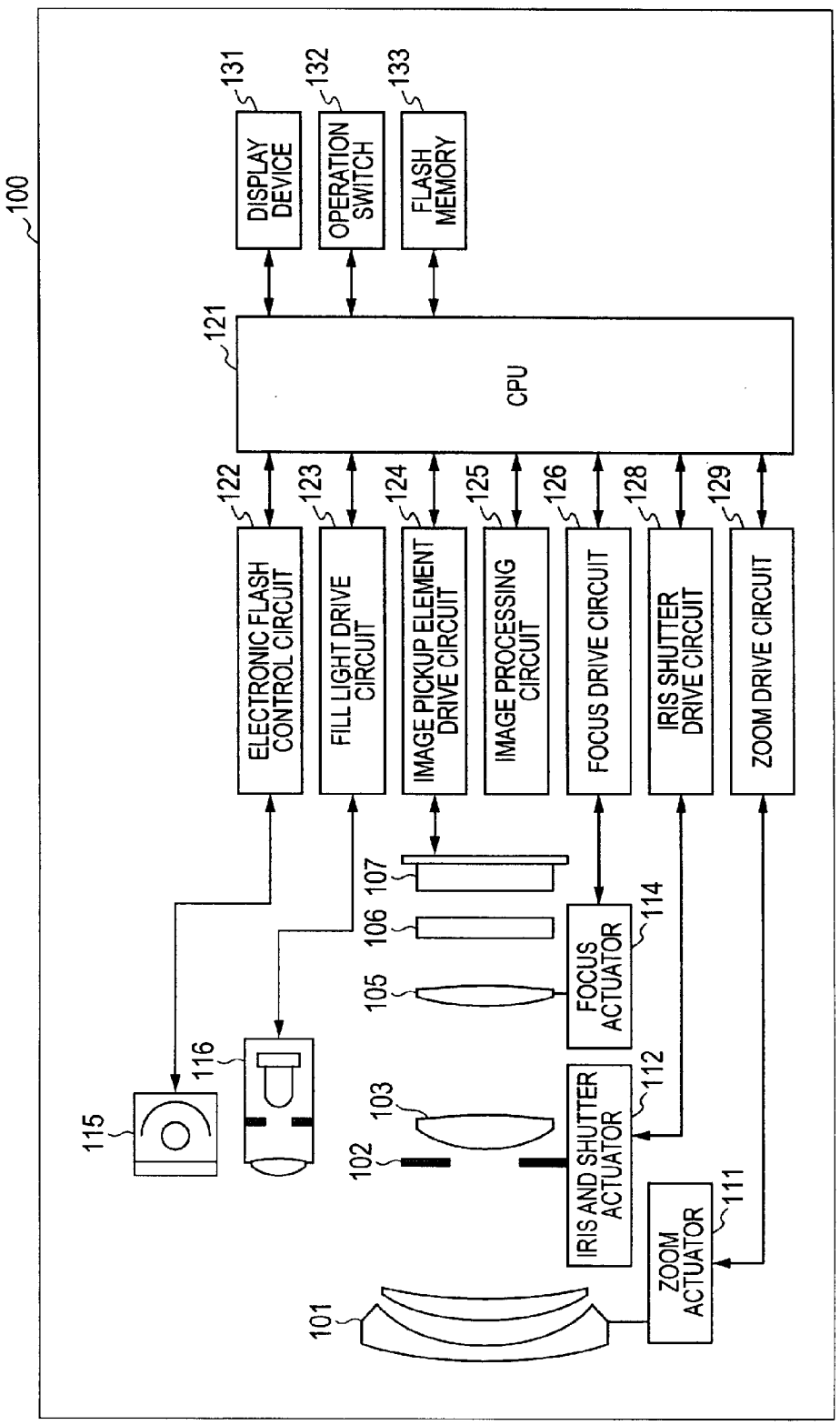
FIG. 1 is a constructional diagram of a camera according to an embodiment of the invention.

FIG. 1 is a constructional diagram of a camera according to the invention and illustrates an electronic camera 100 in which a camera main body having an image pickup element and photographing lenses is integrated. In the diagram, a first lens group 101 is arranged at a front edge of a photographing optical system (focusing optical system) and is held so as to be movable forward and backward in the optical axis direction. An iris shutter 102 serves both as a shutter and an iris, so that a light amount adjustment for photographing is attained by adjusting its aperture diameter and the iris shutter 102 functions as a shutter for adjusting a shutter speed for a photographing of a still image. A second lens group 103 is also provided. The iris shutter 102 and the second lens group 103 move integratedly forward and backward in the optical axis direction and perform the magnification operation (zoom function) in an interlocking relational manner with the forward/backward movement of the first lens group 101.

A third lens group 105 performs a focusing adjustment by the forward/backward movement in the optical axis direction. An optical low-pass filter 106 is an optical element for reducing a false color and moire of a photographed image. An image pickup element 107 is constructed by a C-MOS sensor and its peripheral circuits. As an image pickup element, a two-dimensional single plate color sensor in which primary color mosaic filters of a Bayer array have been formed in an on-chip manner onto light-receiving pixels constructed by m pixels in the lateral direction and n pixels in the vertical direction is used.

A zoom actuator 111 drives the first lens group 101 and the second lens group 103 so as to be movable forward and backward in the optical axis direction by rotating a cam barrel (not shown), thereby performing the zooming operation. An iris and shutter actuator 112 adjusts a photographing light amount by controlling the aperture diameter of the iris shutter 102 and also controls an exposure time for photographing of a still image. A focus actuator 114 drives the third lens group 105 so as to be movable forward and backward in the optical axis direction, thereby performing a focusing adjustment.

An object illuminating electronic flash 115 for photographing is provided. A flash illumination apparatus using a Xenon tube is desirably used as a flash 115. However, an illumination apparatus having LEDs which emit light continuously may be used. An AF fill light unit 116 projects an image of a mask having a predetermined aperture pattern, to a field through a light projecting lens and improves a focus detection ability for a dark object or a low contrast object.

A CPU (camera control unit) 121 is a CPU in the camera and makes various kinds of control of a camera main body. The CPU 121 has an arithmetic operating unit, a ROM, a RAM, an A/D converter, a D/A converter, a communication interface circuit, and the like, drives various kinds of circuits provided in the camera on the basis of a predetermined program stored in the ROM, and executes a series of operations such as AF, photographing, image processing, recording, and the like.

An electronic flash control circuit 122 controls turn-on and off of the illuminating unit 115 synchronously with the photographing operation. A fill light drive circuit 123 controls turn-on and off of the AF fill light unit 116 synchronously with the focus detecting operation. An image pickup element drive circuit 124 controls the image pickup operation of the image pickup element 107, A/D converts the obtained image signal, and transmits the converted image signal to the CPU 121. An image processing circuit 125 executes processings such as gamma conversion, color interpolation, JPEG compression, and the like of the image obtained by the image pickup element 107.

A focus drive circuit 126 drives the focus actuator 114 on the basis of a focus detection result and drives the third lens group 105 so as to move forward and backward in the optical axis direction, thereby performing the focusing adjustment. An iris shutter drive circuit 128 drives the iris and shutter actuator 112 and controls an aperture of the iris shutter 102. A zoom drive circuit 129 drives the zoom actuator 111 in accordance with the zooming operation of the photographer.

A display device 131 such as an LCD or the like displays information regarding a photographing mode of the camera, a preview image before the photographing, a confirmation image after the photographing, an in-focus state display image at the time of the focusing detection, and the like. An operation switch group 132 is constructed by a power switch, a release (photographing trigger) switch, a zoom operation switch, a photographing mode selecting switch, and the like. A detachable flash memory 133 records the photographed image.

Figure 2:
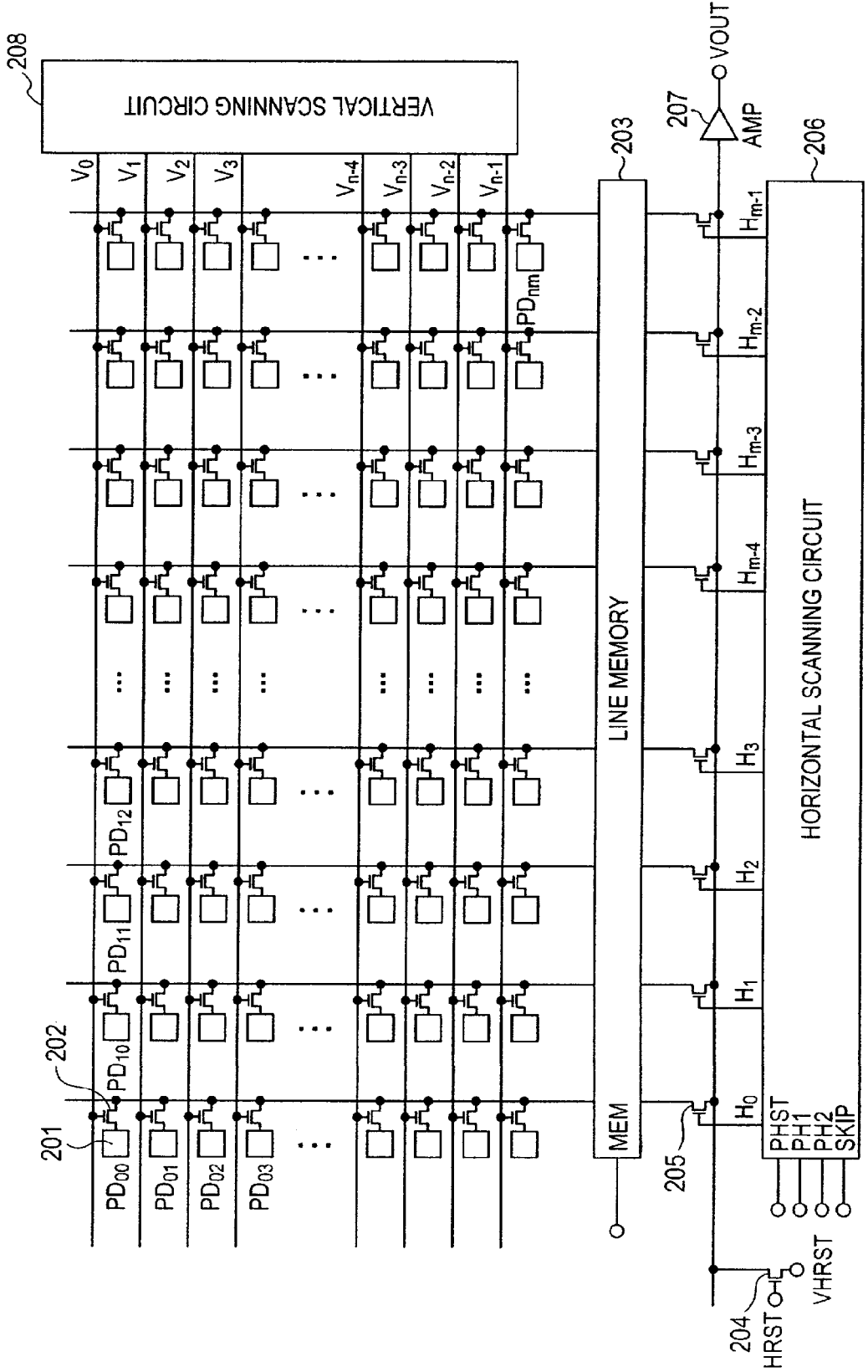
FIG. 2 is a block diagram of a solid-state image pickup element according to the embodiment of the invention.

FIG. 2 illustrates a block diagram of the image pickup element. The block diagram of FIG. 2 illustrates a minimum construction which are necessary for explanation of the reading operation. A pixel reset signal and the like are omitted. In FIG. 2, a photoelectric conversion unit (hereinbelow, abbreviated to $PD_{mn}$: m denotes an X-direction address, m=0, 1, ..., m−1; n denotes a Y-direction address, n=0, 1, ..., n−1) 201 is constructed by a photodiode, a pixel amplifier, a reset switch, and the like. In the image pickup element of the invention, m×n photoelectric conversion units are two-dimensionally and continuously arranged. Reference characters are provided only to the photoelectric conversion units arranged near the left upper photoelectric conversion unit $PD_{00}$ in order to avoid complexity of the diagram.

A switch 202 selects outputs of the photoelectric conversion units $PD_{mn}$ line by line by a vertical scanning circuit 208.

A line memory 203 is used to temporarily store the outputs of the photoelectric conversion units $PD_{mn}$ 201. The line memory 203 stores the outputs of the photoelectric conversion units of one line selected by the vertical scanning circuit. Ordinarily, a capacitor is used as the line memory.

A switch 204 is connected to a horizontal output line, is used to reset the horizontal output line to a predetermined electric potential VHRST, and is controlled by a signal HRST.

A switch 205 is used to sequentially transmit the outputs of the photoelectric conversion units $PD_{mn}$ stored in the line memory 203 to the horizontal output line. By sequentially scanning switches $H_0$ to $H_{m-1}$ by a horizontal scanning circuit 206, which will be described hereinafter, the outputs of the photoelectric conversion of one line are read out.

The horizontal scanning circuit 206 sequentially scans the outputs of the photoelectric conversion units stored in the line memory and transmits to the horizontal output line. A signal PHST is a data input of the horizontal scanning circuit. PH1 and PH2 indicate shift clock inputs. When PH1=H, the data is set. The data is latched in accordance with the shift clock input to the PH2. By inputting shift clocks to the shift clock inputs PH1 and PH2, PHST is sequentially shifted, thereby enabling the switches $H_0$ to $H_{m-1}$ to be sequentially turned on.

A control terminal input SKIP adapted to make the setting at the time of a thinning-out read-out. By setting the SKIP terminal to the H (high) level, the horizontal scan can be skipped at a predetermined interval.

The vertical scanning circuit 208 sequentially scans the outputs and transmits $V_0$ to $V_{-1}$ in a scanning manner, thereby enabling the selecting switch 202 of the photoelectric conversion units $PD_{mn}$ to be selected. In a manner similar to the horizontal scanning circuit, the control signal is controlled by a data input PVST, shift clocks PV1 and PV2, and a thinning-out readout setting SKIP. Since the operation is similar to that of the horizontal scanning circuit, its detailed description is omitted. In the diagram, the above control signal is not shown.

FIGS. 3A, 3B, 4A, 4B, 5A, and 5B are diagrams for describing structures of image pickup pixels and focus detection pixels. In the embodiment, a Bayer array in which among four (=2×2) pixels, two pixels having spectrum sensitivity of G (green) are arranged diagonally and one pixel having spectrum sensitivity of R (red) and one pixel having spectrum sensitivity of B (blue) are arranged as other two pixels is used. The focus detection pixels having a structure, which will be described hereinafter, are distributed and arranged between the Bayer arrays in accordance with a predetermined rule. That is, the image pickup element of the invention has such a structure that the Bayer array of the three kinds of pixels which are sensitive to red, green, and blue is used as a unit, a plurality of Bayer array units are two-dimensionally and continuously arranged, and functional pixels are arranged discretely in the array.

Figure 3A:
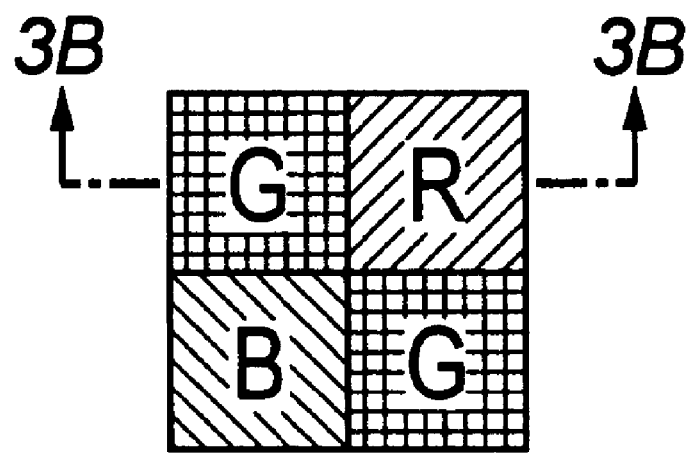
FIG. 3A is a plan view and a cross sectional view of image pickup pixels of the image pickup element according to the embodiment of the invention.
Figure 3B:
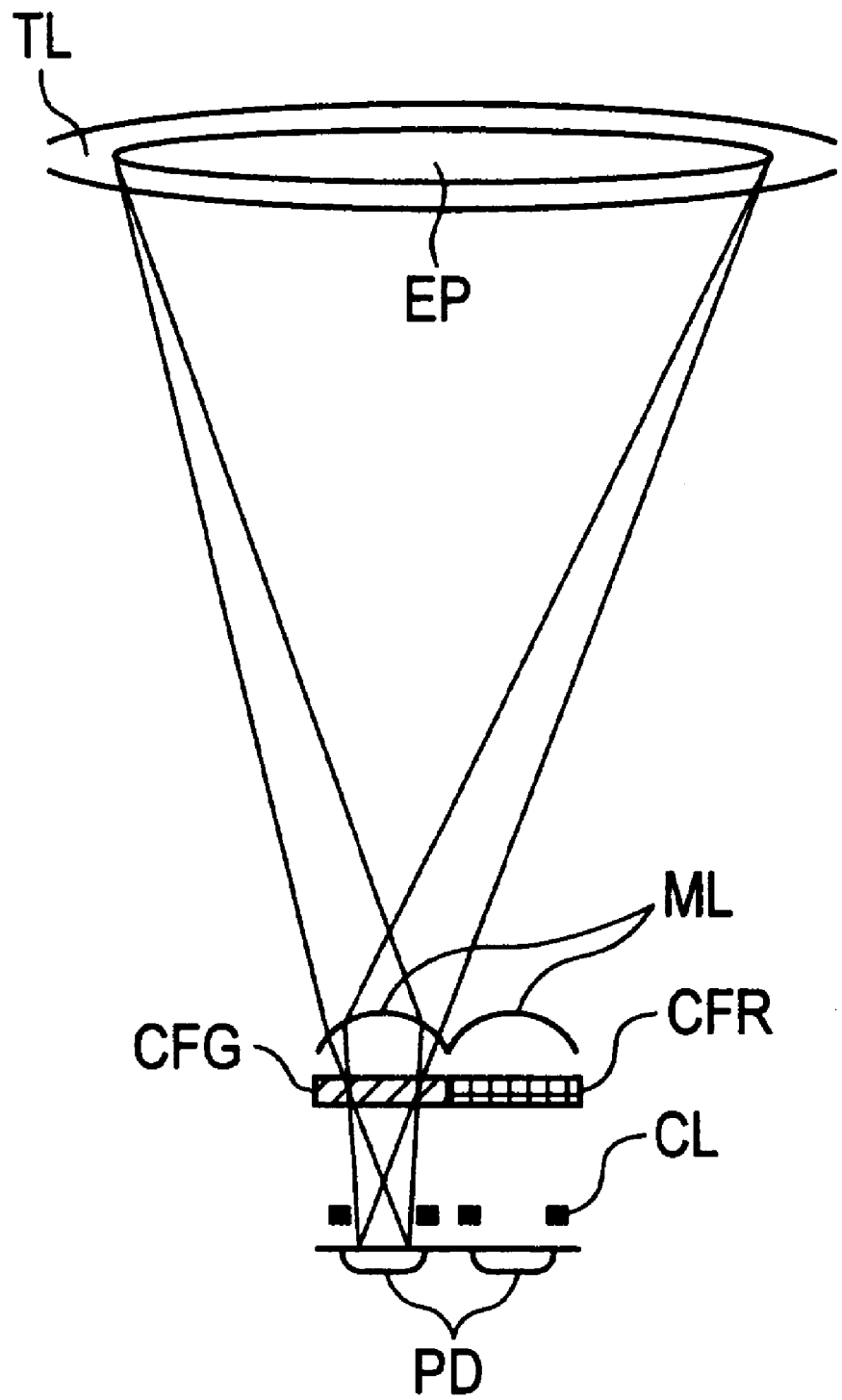
FIG. 3B is a plan view and a cross sectional view of image pickup pixels of the image pickup element according to the embodiment of the invention.

A layout and a structure of the image pickup pixels are illustrated in FIGS. 3A and 3B. FIG. 3A is a plan view of the (2×2) image pickup pixels. As is well known, in the Bayer array, the G pixels are arranged diagonally and the R pixel and the B pixel are arranged as other two pixels. The structure of (two rows×two columns) is repetitively arranged.

FIG. 3B is a cross sectional view taken along the line 3B-3B in FIG. 3A. An on-chip micro lens ML is arranged on the forefront surface of each pixel. A color filter CFR of R (red) and a color filter CFG of G (Green) are provided. A photoelectric conversion unit PD of a C-MOS sensor is schematically illustrated. Wiring layers CL are provided to form signal lines for transmitting various kinds of signals in the C-MOS sensor. A photographing optical system TL is schematically illustrated.

The on-chip micro lenses ML and the photoelectric conversion units PD of the image pickup pixels are constructed so that the light which passed through the photographing optical system TL is effectively concentrated as much as possible. In other words, an exit pupil EP of the photographing optical system TL and the photoelectric conversion unit PD have a conjugate relationship by the micro lenses ML and an effective area of the photoelectric conversion unit is designed so as to have a large area. Although the incident light of the G pixel has been described in FIG. 3B, each of the R pixel and the b (Blue) pixel also has the same structure as that of the G pixel. Therefore, the exit pupil EP corresponding to each of the RGB image pickup pixels has a large diameter, thereby enabling the light from the object to be efficiently fetched and improving an S/N ratio of the image signal.

Figure 4A:
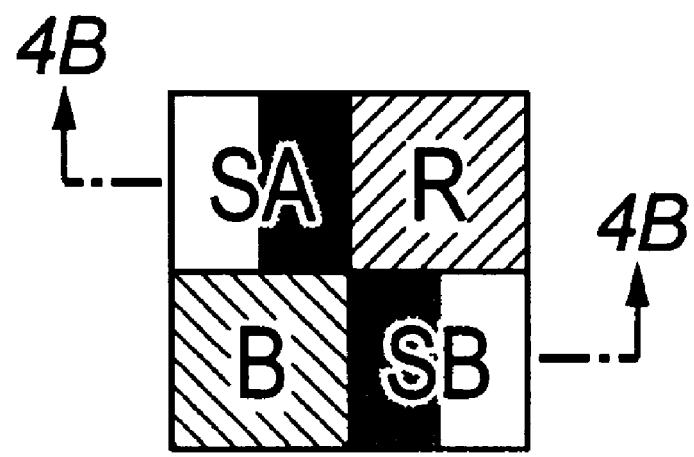
FIG. 4A is a plan view and a cross sectional view of focus detection pixels of the image pickup element according to the embodiment of the invention.
Figure 4B:
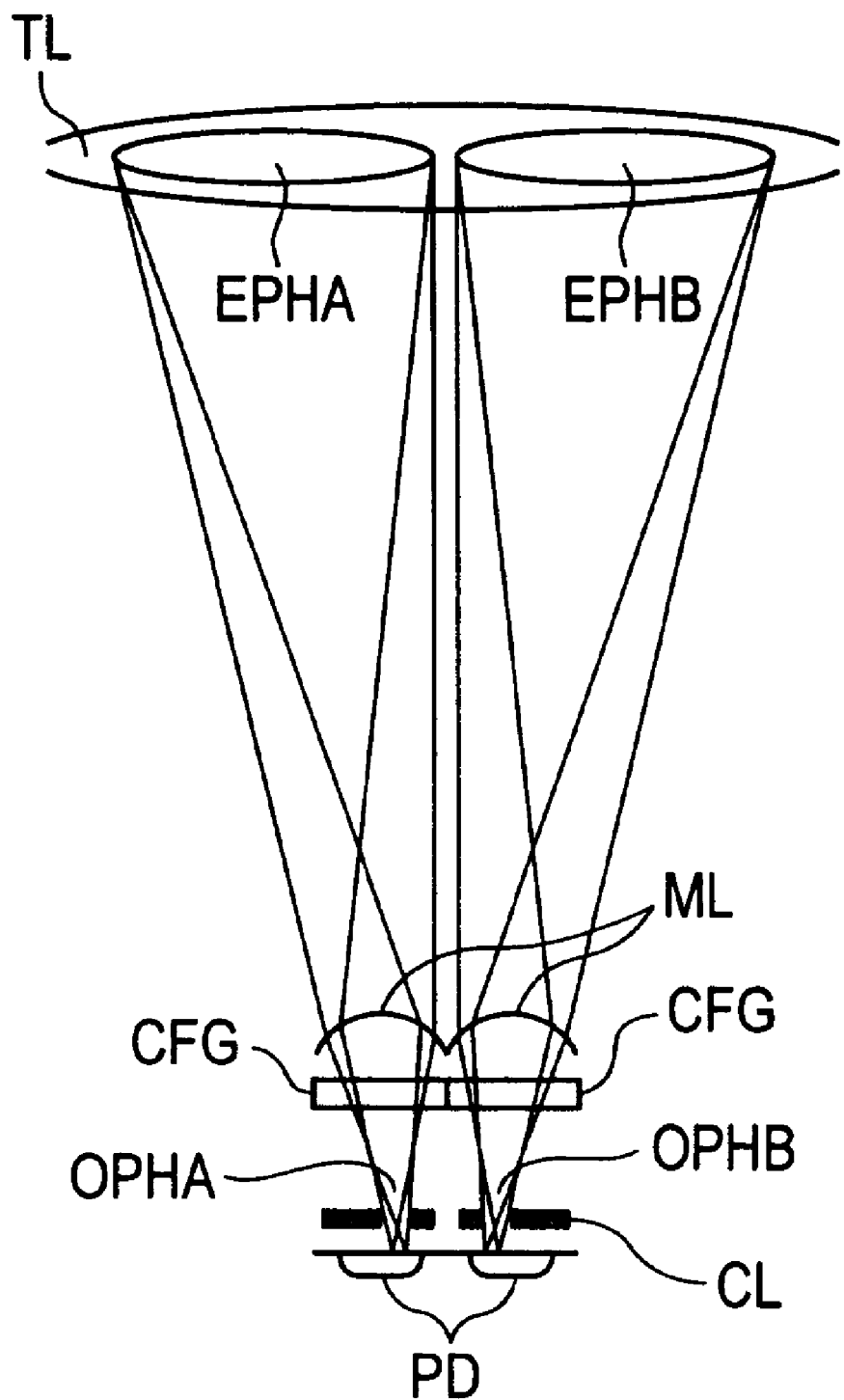
FIG. 4B is a plan view and a cross sectional view of focus detection pixels of the image pickup element according to the embodiment of the invention.

FIGS. 4A and 4B illustrate a layout and a structure of the focus detection pixels to perform the pupil division in the horizontal direction (lateral direction) of the photographing lens. That is, the focus detection pixels according to the invention are functional pixels for receiving the image light obtained by the optical system and detecting a focusing adjustment state of the optical system by a pupil division method. The horizontal direction or the lateral direction is defined as follows. That is, when the user holds the camera so that the optical axis of the photographing optical system becomes horizontal, it indicates the direction along a straight line which perpendicularly crosses the optical axis and extends in the horizontal direction. FIG. 4A is a plan view of the pixels of (two rows×two columns) including the focus detection pixels. In the embodiment, since the signals of the focus detection pixels are used for image creation, it is required that the S/N ratio is high even in the signals of the focus detection pixels. Therefore, the pixels of R and B are left as image pickup pixels and the pixels of G are used as focus detection pixels. That is, the functional pixels according to the invention are arranged at the positions corresponding to the pixels which are sensitive to green on the image pickup element. They are shown by SA and SB in FIG. 4A.

FIG. 4B is a cross sectional view taken along the line 4B-4B in FIG. 4A. Each of the micro lens ML and the photoelectric conversion unit PD has the same structure as that of the image pickup pixels illustrated in FIG. 4B. In the embodiment, since the signals of the focus detection pixels are used for image creation, the color separation color filters are arranged without being changed. However, a transparent film CFW (White) may be used in place of the filter of G. In order to perform the pupil division in the image pickup element, an opening portion of the wiring layer CL is deviated to one direction for a center line of the micro lens ML. Specifically speaking, since a pixel SA and its opening portion OPHA are deviated to the right, the light which passed through an exit pupil EPHA on the left side of a photographing lens TL is received. Similarly, since an opening portion OPHB of a pixel SB is deviated to the left, the light which passed through an exit pupil EPHB on the right side of the photographing lens TL is received. Therefore, the pixels SA are regularly arranged in the horizontal direction and an object image obtained by those pixel group is assumed to be an A image. The pixels SB are also regularly arranged in the horizontal direction and an object image obtained by those pixel group is assumed to be a B image. By detecting relative positions of the A image and the B image, a defocus amount of the object image can be detected.

In the pixels SA and SB, although the focus detection can be performed to an object having brightness distribution in the lateral direction of a photographing display screen, for example, to a vertical line, the focus detection cannot be performed to a lateral line having brightness distribution in the vertical direction. When the user wants to detect a defocus amount in the vertical direction, it is sufficient to construct by upwardly deviating the pixel SA and its opening portion OPHA and by downwardly deviating the pixel SB and its opening portion OPHB.

Figure 5A:
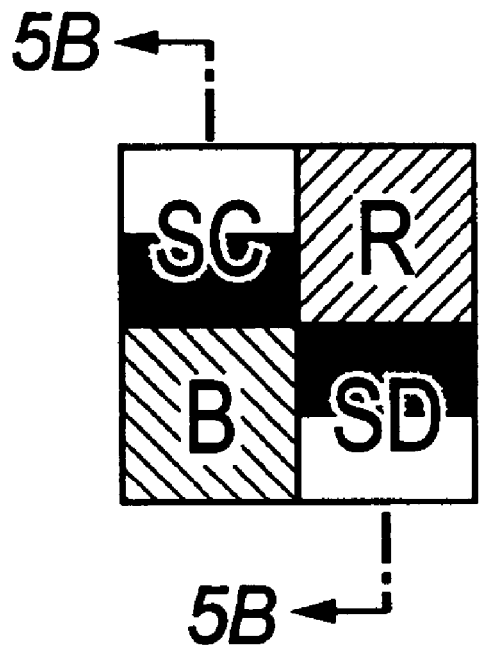
FIG. 5A is a plan view and a cross sectional view of focus detection pixels of the image pickup element according to the embodiment of the invention.
Figure 5B:
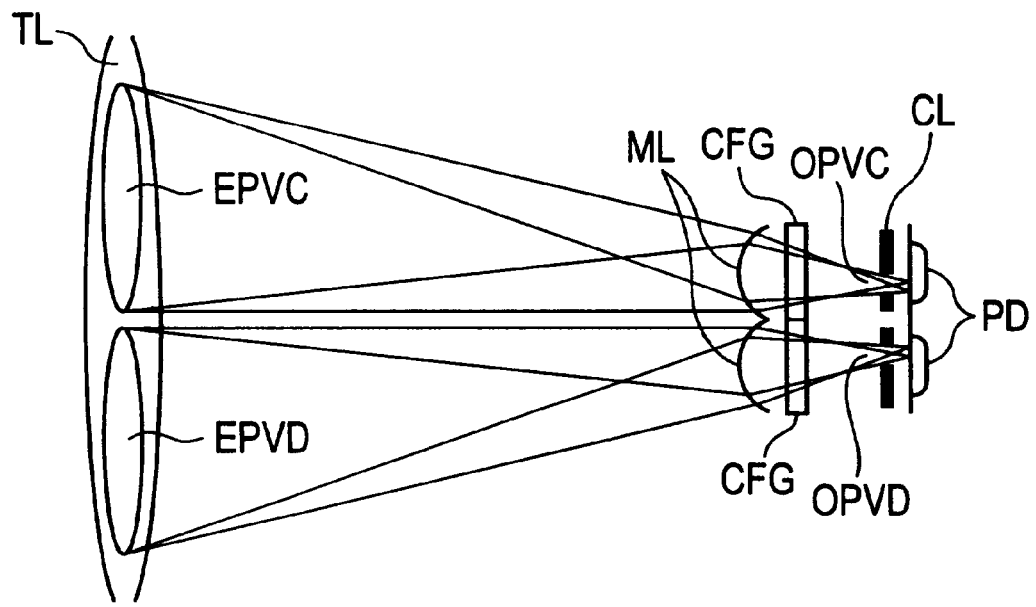
FIG. 5B is a plan view and a cross sectional view of focus detection pixels of the image pickup element according to the embodiment of the invention.

FIGS. 5A and 5B illustrate a layout and a structure of the focus detection pixels to perform the pupil division in the vertical direction of the photographing optical system. The vertical direction and the lateral direction are defined as follows. That is, when the user holds the camera so that the optical axis of the photographing optical system becomes horizontal, the direction along a straight line which crosses the optical axis at right angles and extends in the perpendicular direction indicates the vertical direction. FIG. 5A is a plan view of the pixels of two rows×two columns, including the focus detection pixels. In a manner similar to FIG. 4A, the pixels of R and B are retained as image pickup pixels and the pixels of G are used as focus detection pixels. They are shown by SC and SD in FIG. 5A.

FIG. 5B is a cross sectional view taken along the line 5B-5B in FIG. 5A. Although the pixels in FIG. 4B have a structure in which the pupil division is performed in the lateral direction, the pixels in FIG. 5B have a structure similar to that of the pixels in FIG. 4B except that the pupil dividing direction is merely set to the longitudinal direction (vertical direction). That is, since an opening portion OPVC of the pixel SC is downwardly deviated, the light which passed through an exit pupil EPVC on the upper side of the photographing optical system TL is received. Similarly, since an opening portion OPVD of the pixel SD is upwardly deviated, the light which passed through an exit pupil EPVD on the lower side of the photographing optical system TL is received. Therefore, the pixels SC are regularly arranged in the vertical direction and an object image obtained by those pixel group is assumed to be a C image. The pixels SD are also regularly arranged in the vertical direction and an object image obtained by those pixel group is assumed to be a D image. By detecting relative positions of the C image and the D image, a defocus amount of the object image having brightness distribution in the vertical direction can be detected.

Figure 6:
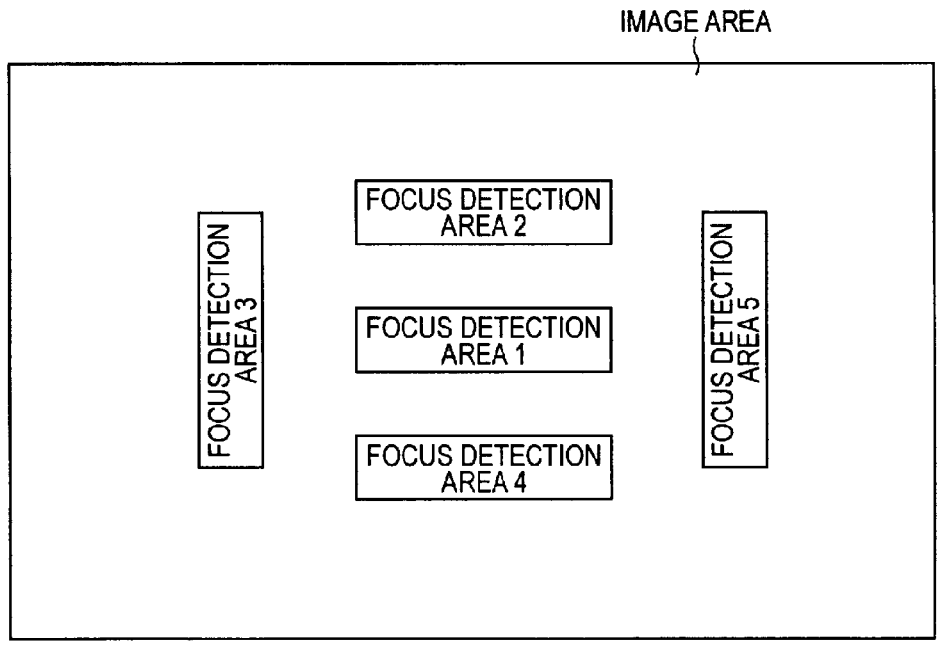
FIG. 6 is a diagram illustrating focus detection areas of the image pickup element according to the embodiment of the invention.

FIG. 6 is an example illustrating focus detection areas on the image pickup display screen. A plurality of focus detection areas 1 to 5 are set onto the image pickup display screen and the focus detection pixels are arranged correspondingly to the focus detection areas 1 to 5 on the image pickup display screen. That is, with respect to the focus detection pixel group on the image pickup element, the focus detection is performed by sampling images from the object images focused in the areas corresponding to the focus detection areas 1 to 5.

Figure 7:
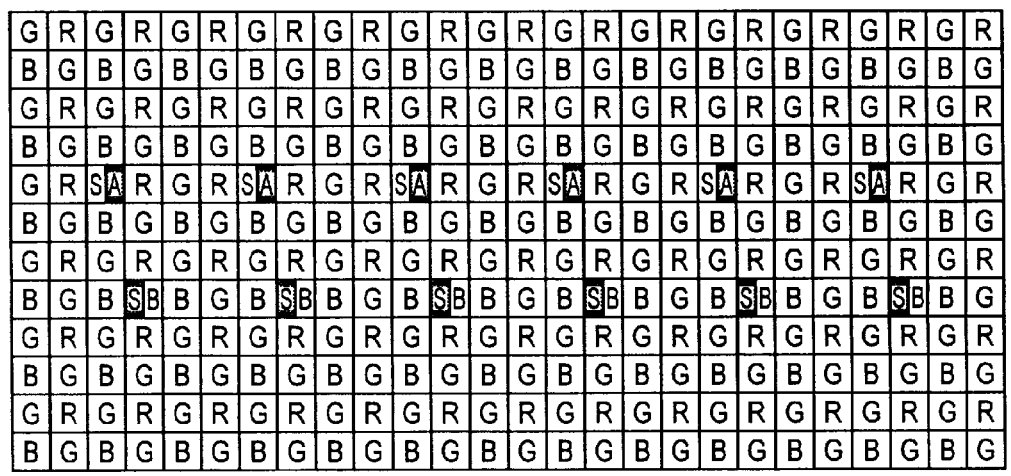
FIG. 7 is a diagram illustrating a pixel layout pattern in the focus detection area of the image pickup element according to the embodiment of the invention.

FIG. 7 is a diagram illustrating a layout of the image pickup pixels and the focus detection pixels. In the diagram, pixels G on which the green filters is deposited, pixels R on which the red filters is deposited, and pixels B on which the blue filters is deposited are arranged. In the diagram, SA denotes the focus detection pixels formed by deviating the openings of the pixel portions in the horizontal direction are arranged, and they are a reference pixel group for detecting an image displacement amount in the horizontal direction between the SA pixel group and the SB pixel group which will be described hereinafter. SB denotes the focus detection pixels formed by deviating the opening portions of the pixels in the direction opposite to that of the SA pixels are arranged, and they are a reference pixel group for detecting an image defocus amount in the horizontal direction from the SA pixel group. Reverse portions of the SA and SB pixels indicate opening positions of the deviated pixels. The focus detection pixels according to the invention receive the image light for the pupil having a size which is equal to or larger than the half of that of the ordinary image pickup pixels.

Figure 8:
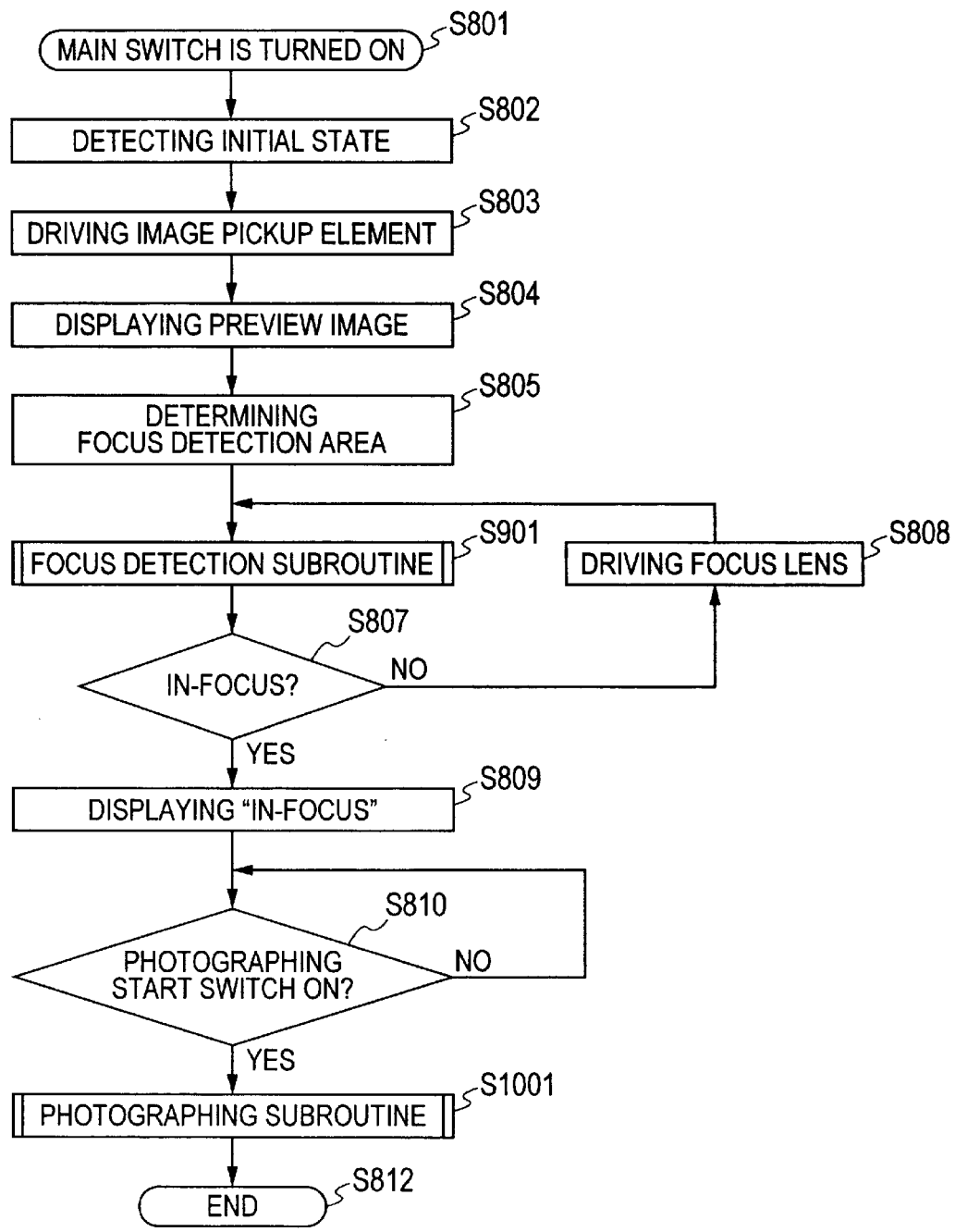
FIG. 8 is a flowchart illustrating the operation of the camera according to the embodiment of the invention.

FIG. 8 is a flowchart illustrating the operation of the camera in the embodiment.

When the photographer turns on a power switch (main switch) of the camera (step S801), in step S802, the CPU 121 confirms the operation of each actuator in the camera and the operation of the image pickup element, initializes the contents in the memory and an executing program, and executes the photographing preparation operation. In step S803, the image pickup operation of the image pickup element is started and a low resolution moving image for preview is output. In step S804, the read-out moving image is displayed onto the display device 131 provided on a rear surface of the camera and the photographer observes the preview image and decides an image frame for photographing.

In step S805, the focus detection area is decided from the image area in FIG. 6. After that, step S901 follows and a focus detecting subroutine is executed.

Figure 9:
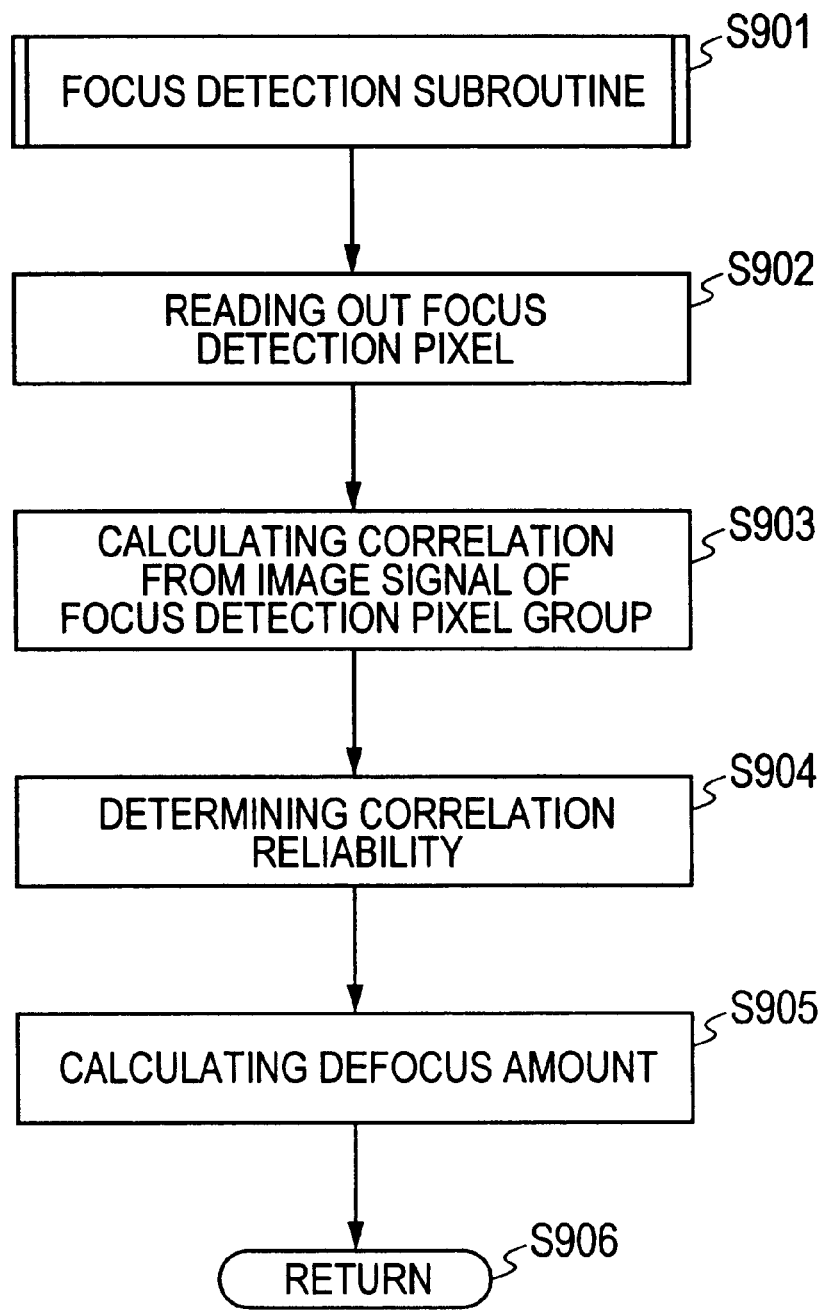
FIG. 9 is a flowchart illustrating the focus detecting operation according to the embodiment of the invention.

FIG. 9 is a flowchart for the focus detecting subroutine. When the processing routine is jumped to this subroutine from step S901 in the main flow, in step S902, the focus detection pixels included in the focus detection area decided in step S805 are read out. In step S903, a correlation operation of the obtained two images is executed and a relative positional difference amount of the two images is calculated. In step S904, a reliability of a result of the correlation operation is discriminated. The reliability here denotes a coincidence degree of the two images and when the coincidence degree of the two images is large, the reliability of the focus detection result is generally high. Therefore, if a plurality of focus detection areas were selected, information having the high reliability is preferentially used.

In step S905, a defocus amount is calculated from the detection result of the high reliability. In step S906, the processing routine is returned to step S807 in the main flow in FIG. 8.

In step S807 in FIG. 8, whether or not the defocus amount calculated in step S905 in FIG. 9 is equal to or less than a permission value is discriminated. If the defocus amount is equal to or larger than the permission value, it is determined that the focusing state is an out-of-focus state. In step S808, the focus lens is driven. After that, steps S901 to S807 are repetitively executed. If it is decided in step S807 that the focusing state has reached an in-focus state, the in-focus display is performed in step S809 and the processing routine advances to step S810.

In step S810, whether or not a photographing start switch has been turned on is discriminated. If it is not turned on, a photographing standby state is maintained in step S810. If the photographing start switch has been turned on in step S810, step S1001 follows and the photographing subroutine is executed.

Figure 10:
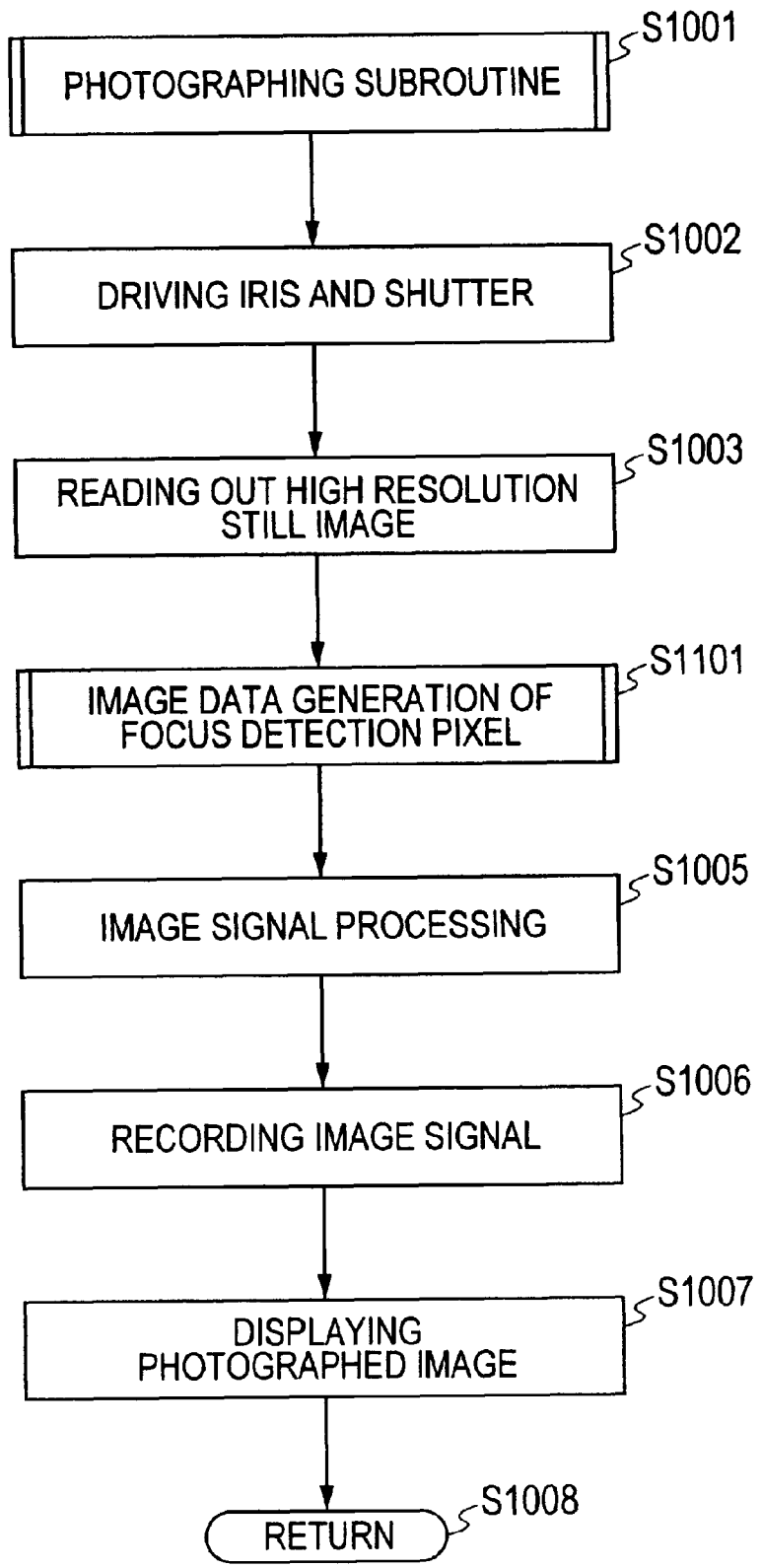
FIG. 10 is a flowchart illustrating the photographing operation according to the embodiment of the invention.

FIG. 10 is a flowchart for the photographing subroutine. When the photographing start switch is turned on, the processing routine starts from step S1001. In step S1002, a light amount adjustment iris is driven and aperture control of a mechanical shutter which specifies the exposure time is made. In step S1003, the image readout for the sill image photographing of high resolution, that is, the readout of all pixels is performed. In step S1101, in the readout image signal, image data at the position of each focus detection pixel is generated.

Figure 11:
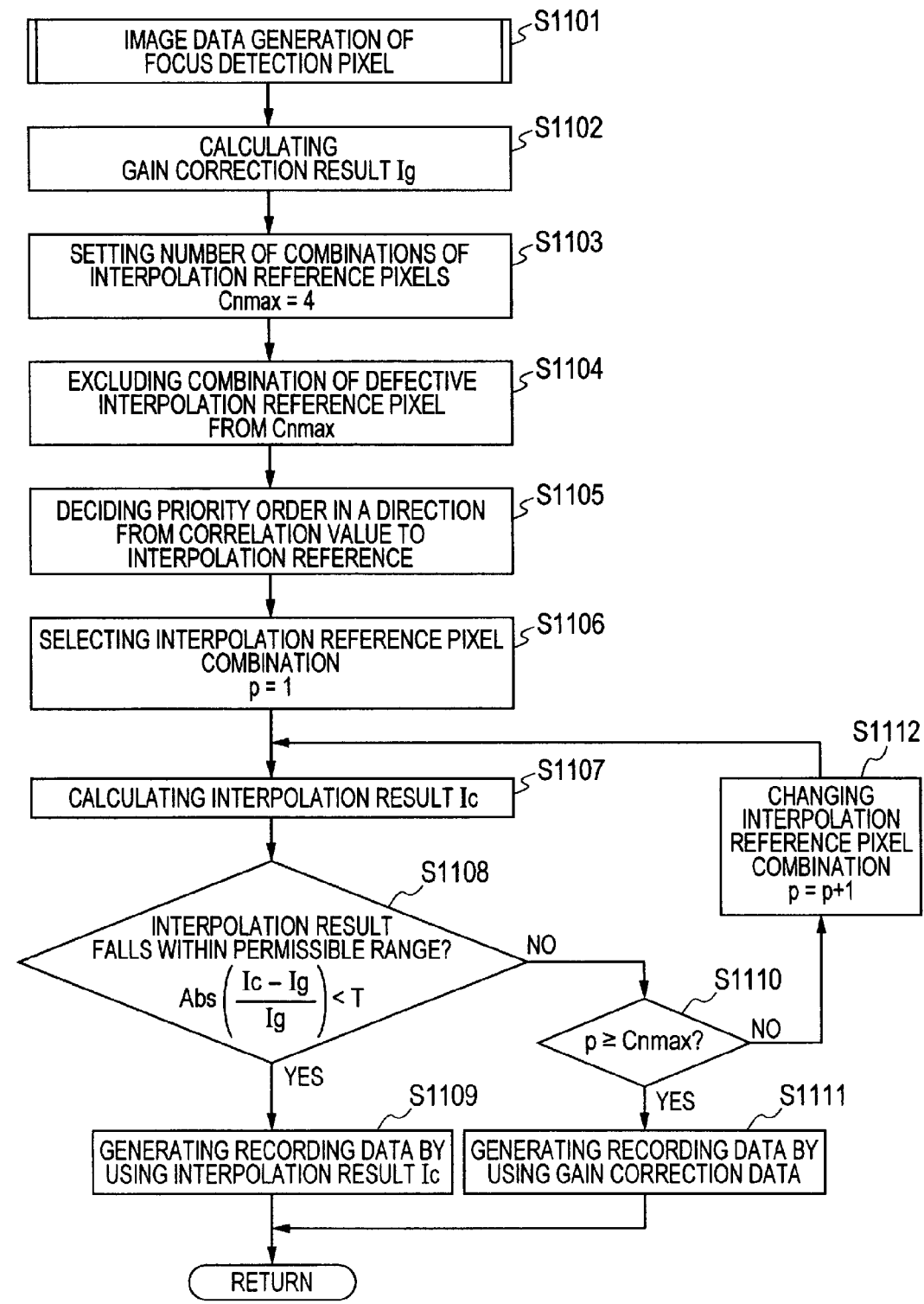
FIG. 11 is a flowchart illustrating the image processing operation according to the embodiment of the invention.

FIG. 11 is a flowchart for the subroutine to generate the image data at the position of each focus detection pixel.

In the focus detection pixels, as will be also understood from FIGS. 5A, 5B, and 6, a field of view is restricted by a light shielding layer provided every pixel. Therefore, a level of the image signal from the focus detection pixel differs from a level of the image signal from the image pickup pixels locating around the focus detection pixel. The camera 100 has a plurality of units for generating (estimating) the image data at each pixel position of a focus detection pixel line. First, there is a gain correcting unit (first estimating unit) for executing a gain correction operation by using the signal of the focus detection pixels in the image creation. Second, there is an interpolating unit (second estimating unit) for generating the image data on the basis of the image pickup pixel signals of the image pickup pixels around the focus detection pixel. The interpolating unit calculates a simple average of the outputs of the image pickup pixels around the focus detection pixel, thereby obtaining the image data at the position of the focus detection pixel. Therefore, in the case where the object of high contrast was photographed near the focus detection pixel, there is a possibility that the image data obtained by the interpolation processing is different far from the output of the image pickup pixel which is assumed to be arranged at that position instead of the focus detection pixel. On the other hand, the gain correcting unit can generate the image data which does not depend on the object as compared with the interpolating unit. Therefore, the image data obtained by the gain correcting unit is used as an index to determine a combination of the image pickup pixels which are referred to when executing the interpolation processing.

Figures 12, 13:
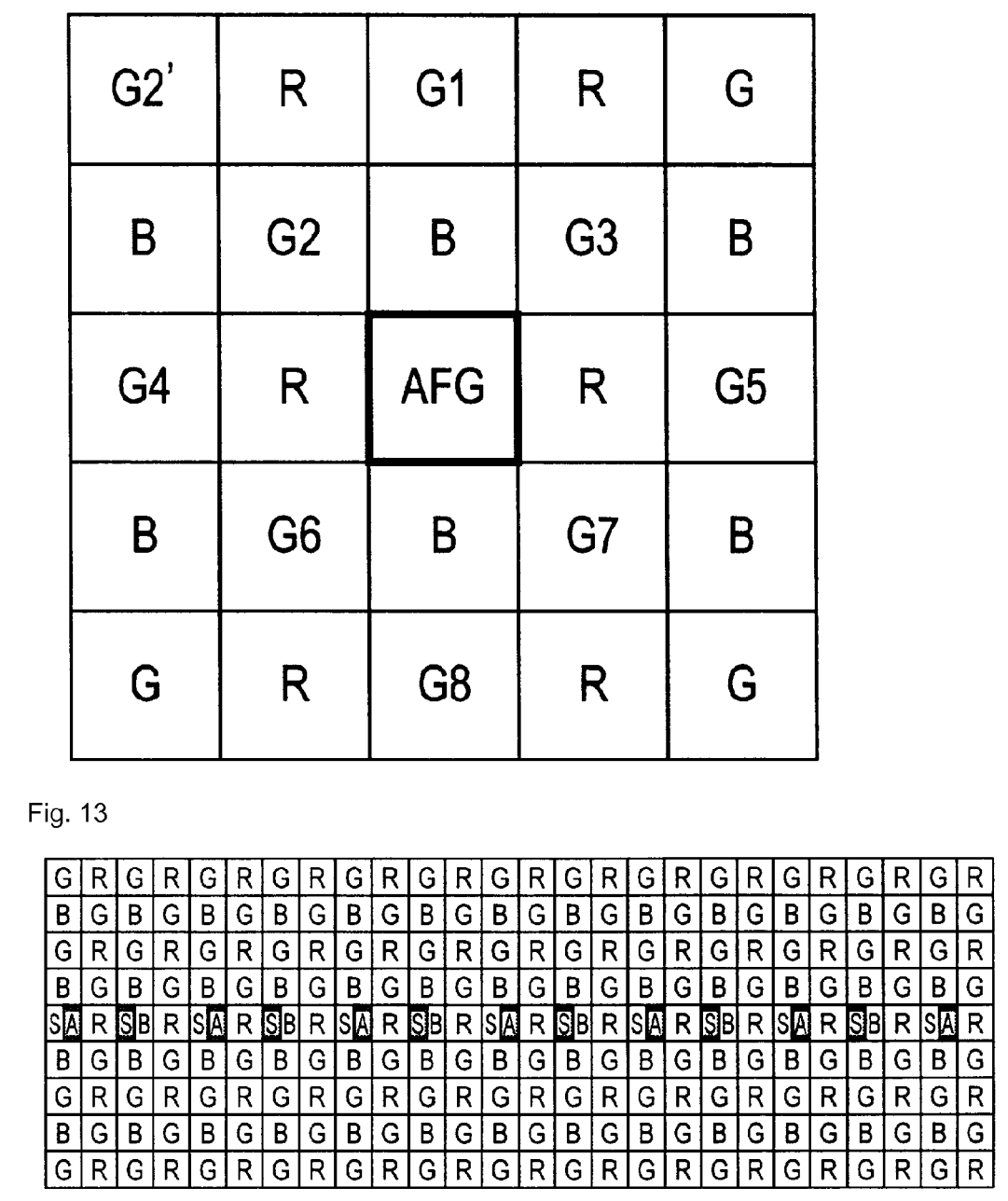

FIG. 12 illustrates a layout of the focus detection pixel group and the image pickup pixels around the focus detection pixel. It is assumed that an output of the focus detection pixel arranged at the position where the G pixel should be arranged is J(AFG) and outputs of the G pixels around it are I(G1) to I(G8).

In step S1102, the image data at each pixel position of the focus detection pixel group is generated by correcting a gain of the output J(AFG) of the focus detection pixel. The image data which is calculated by the gain correction is assumed to be Ig(AFG).

As for a gain correction value in each focus detection pixel, a numerical expression which is calculated of the basis of the position of each pixel for every condition of the lens and iris is stored in the camera in advance. Or, the apparatus may have a gain adjusting unit for obtaining the gain correction value in a real-time manner on the basis of the output of the focus detection pixel and the outputs of the image pickup pixels of the same color arranged around the focus detection pixel each time the image pickup is performed.

In step S1103, the number of combinations of the image pickup pixels which are to be referred to when the image data at the position of the focus detection pixel is generated by the interpolation processing is executed from the image pickup data of the image pickup pixels around the focus detection pixel, is set into Cnmax. An example (in this case, a maximum value of Cnmax is equal to 4) in which the combinations of the image pickup pixels which are to be referred to when the interpolation processing is executed are assumed to be (G1, G8), (G4, G5), (G3, G6), and (G2, G7) will be described. Although the four combinations of the interpolation reference pixels have been disclosed in the embodiment, as image pickup pixels which are to be referred to in the interpolation processing, the pixels which are further away from the focus detection pixel may be used. In step S1104, whether or not a defective pixel is included in the foregoing image pickup pixels (G1, G8), (G4, G5), (G3, G6), and (G2, G7) which are referred to is discriminated. If the combination of the reference pixels including the defective pixel exists, a value of the number Cnmax of those combinations is subtracted. If G2 is the defective pixel, G2' may be used as an interpolation reference pixel in place of G2. That is, the present invention has: a defective pixel discriminating unit for discriminating whether or not the defective pixel is included in a plurality of interpolation reference pixels; and an interpolation reference pixel selecting unit for selecting combinations of the interpolation reference pixels in accordance with a discrimination result of the defective pixel discriminating unit. In step S1105, priority orders are allocated to the combinations of the plurality of interpolation reference pixels. As a method of allocating the priority orders, absolute values of differences of the image pickup data of the pixels which are referred to are compared.

$$abs(I(G1)-I(G8)), abs(I(G4)-I(G5)),$$

$$abs(I(G3)-I(G6)), abs(I(G2)-I(G7))$$

abs( ) denotes a symbol indicative of an absolute value. The priority order is set to be higher in order from the smaller one of the absolute values of the differences of the image pickup data of the pixels which are referred to, and numerical values (if there is no defective pixel in the reference pixels, 1, 2, 3, and 4 in order from the higher priority order) are allocated in descending order of the priority from highest to lowest. The image data obtained based on the interpolation processing from the combinations of the image pickup pixels mentioned above is expressed by the following equations (1) to (4).

$$Ic1(AFG)=(I(G1)+I(G8))/2 \quad (1)$$

$$Ic2(AFG)=(I(G4)+I(G5))/2 \quad (2)$$

$$Ic3(AFG)=(I(G3)+I(G6))/2 \quad (3)$$

$$Ic4(AFG)=(I(G2)+I(G7))/2 \quad (4)$$

In step S1106, the numerical value 1 set in the numerical value allocation based on the priority order of the image pickup pixel which is referred to is set into p. In step S1107, the interpolation processing is executed by the interpolation reference pixels in accordance with the set value of p, thereby calculating the image data.

In step S1108, the following conditional discrimination is made to discriminate whether or not the image data generated by the interpolation processing is correct for to the image data at the position of the focus detection pixel. When the image data generated by the interpolation processing satisfies the following expression (5), it is determined that the generated image data is correct.

$$abs((Ic(AFG)-Ig(AFG))/Ig(AFG))<T \quad (5)$$

In the expression (5), T denotes a predetermined threshold. In this expression, the above discrimination is made on the basis of a ratio of a difference between the image data generated by the interpolation processing and the image data generated by the gain correction processing, to the image data generated by the gain correction processing. The discriminating expression is not limited to the expression (5) but the above discrimination may be made on the basis of a difference between the image data generated by the gain correction processing and the image data generated by the interpolation processing. That is, the present invention has an image output selecting unit for selecting the image outputs at the positions of the functional pixels on the basis of the estimation results obtained by the first and second estimating units, wherein, particularly, the image outputs at the positions of the functional pixels are selected in accordance with whether or not a difference between a plurality of estimation results which are obtained by the second estimating unit in accordance with combinations of a plurality of interpolation reference pixels and the estimation result obtained by the first estimating unit falls within a predetermined value or less.

If it is decided that the image data generated by the interpolation processing is correct, the processing routine advances to step S1109. The image data at the position of the focus detection pixel is set as Ic(AFG) obtained in step S1107.

If it is decided in step S1108 that the image data generated by the interpolation processing is not correct, the processing routine advances to step S1110. In step S1110, whether or not there are other combinations of the image pickup pixels which are to be referred to when the interpolation processing is executed is discriminated. If there are the other combinations ("NO" in step S1110), the image data is calculated again by the interpolation processing in accordance with the combination having the next high priority order of the reference pixels and processing steps similar to those mentioned above are repeated (step S1112). In the case where the processings are repeated and there are no other combinations of the image pickup pixels which are to be referred to when the interpolation processing is executed ("YES" in step S1110), it is determined that it is difficult to generate the image data by the interpolation processing. The processing routine advances to step S1111 and the image data at the position of the focus detection pixel is set as the image data Ig(AFG) generated by the gain correction processing. In this instance, a value obtained by weighted-addition of the image data generated by the gain correction processing and the image data generated by the interpolation processing may be used as image data in place of the image data generated by the gain correction processing. In this case, assuming that the image data generated by the gain correction processing is Ig(AFG) and the image data by the interpolation processing which results in a value that is closest to the gain correction result is Ic(AFG), image data expressed by the following equation (6) is set to the image data at the position of the focus detection pixel.

$$I=k1 \times Ig(AFG)+k2 \times Ic(AFG) \quad (6)$$

where, k1 and k2 denote weight coefficients which satisfy k1+k2=1.

That is, according to the image output selecting unit of the invention, even for any one of the plurality of estimation results which are obtained by the second estimating unit in accordance with the combinations of the plurality of interpolation reference pixels, if a difference between such an estimation result and the estimation result obtained by the first estimating unit does not fall within the predetermined value or less, the estimation result obtained by the first estimating unit or the estimation result formed by the weighted-addition of the estimation results obtained by the first and second estimating units can be selected as an output of the image at the position of the functional pixel.

The image processing operation in the case where the focus detection pixel is the defective pixel will now be described although its description is omitted to avoid FIG. 11 from becoming complicated. If the focus detection pixel is the defective pixel, a possibility that the gain correction processing result which is obtained in step S1102 becomes the image signal which is different away from an image signal of the image pickup pixel that is assumed to be arranged at the position of the focus detection pixel is high. Therefore, the interpolation processing result calculated when p=1 is set is output as an image signal. With respect to this, the image processing apparatus of the invention has a defective pixel discriminating unit for discriminating whether or not the ordinary image pickup pixels and the functional pixel are the defective pixels, wherein the image output selecting unit selects one of the estimation results obtained by the first and second estimating units as an output of the image at the position of the functional pixel in accordance with a result of the defective pixel discriminating unit.

Also with respect to image data at the position of another pixel in the focus detection pixel group, the image data is similarly generated on the basis of a comparison between the image data which is generated by the gain correction processing and the image data which is generated by the interpolation processing. When the image data is generated at the positions of all of the focus detection pixels, the processing routine is returned to S1005.

In step S1005, image processings such as gamma correction, edge emphasis, and the like of the image are executed. In step S1006, the photographed image is recorded into the flash memory 133. In step S1007, the photographed image is displayed onto the display device 131. In step S1008, the processing routine is returned to the main flow of FIG. 8.

When the processing routine is returned to the main flow of FIG. 8, a series of photographing operations is finished in step S812.

As described above, in the invention, with respect to the generation of the image signal at the position of the focus detection pixel, a plurality of pixels which are referred to in the interpolation processing are selected based on the image signal generated by the gain correction processing which relatively does not depend on the object. Therefore, the deterioration in image quality due to the image signal generated by the interpolation processing can be reduced. Consequently, in the invention, since the proper interpolation pixel can be generated, the number of focus detection pixels can be increased while maintaining a decreasing effect of the deterioration in image quality due to the interpolation. Further, according to the invention, it is detected that the focus detection pixel is the defective pixel, and the pixel value interpolation construction which does not use its pixel value can be provided, so that the reduction of the image quality deterioration can be more effectively accomplished.

The above-described embodiment is nothing but a typical example and upon embodying the present invention, various modifications and changes of the embodiment are possible.

For example, although the example in which the focus detection pixels are arranged every four pixels and the pixels SA and SB are arranged to the different lines has been shown in the image pickup element illustrated in FIG. 7, as illustrated in FIG. 13, even if the focus detection pixels SA and SB are alternately arranged at the positions of all of the G pixels constructing one line in the specific focus detection area, a similar effect is obtained. However, in the case where the focus detection pixels were densely arranged as illustrated in FIG. 13, the number of combinations of the pixels which are referred to when the image data at the position of the focus detection pixel is interpolation operated, decreases. FIG. 14 is a layout diagram of the focus detection pixels and the pixels around the focus detection pixel in FIG. 12. In the diagram, in the case where image information at the position of the focus detection pixel AFG2 is interpolation operated from the outputs of the ordinary pixels around the focus detection pixel, the reference pixels which are used in the interpolation operation are (G1, G8), (G3, G6), and (G2, G7).

In the processing for generating the image data at the position of the focus detection pixel illustrated in FIG. 12, the absolute values of the differences of the image pickup signals of the pixels which are referred to are compared, priority orders are previously allocated to the combining directions of the pixels which are referred to in the interpolation processing, it is compared with the image data which was generated by the gain correction processing one by one from the image data of the interpolation processing according to the combination having the high priority order of the reference pixels. However, as illustrated in FIG. 15, a method whereby, first, all of Ic(AFG) (step S1504) calculated by the equations (1) to (4) are compared with the image data Ig(AFG) generated by the gain correction processing and an interpolation result adapted to obtain the image data that is closest to the image data generated by the gain correction processing is used as image data may be used (step S1505). That is, in the invention, the image output selecting unit can be also constructed by such a method that among a plurality of estimation results which are obtained by the second estimating unit in accordance with combinations of a plurality of interpolation reference pixels, the estimation result that is closest to the estimation result which is obtained by the first estimating unit is selected as an output of the image at the position of the functional pixel. A similar effect is also obtained by such a method.

The camera control unit 121 may be controlled by one hardware or the whole apparatus may be controlled by a method whereby a plurality of hardware bears their shares of the processing.

Although the present invention has been described in detail above with respect to the exemplary embodiments, the invention is not limited to those specific embodiments and various modifications within the scope without departing from the essence of the invention are also incorporated in the present invention. Further, each of the foregoing embodiments merely shows an embodiment of the invention and those embodiments can be also properly combined.

As for the processings of the embodiments mentioned above, a storage medium in which program codes of software which embodies each of the functions have been recorded may be provided to a system or an apparatus. A computer (or CPU or MPU) of the system or apparatus reads out and executes the program codes stored in the storage medium, thereby enabling the functions of the embodiments mentioned above to be realized. In this case, the program codes themselves read out of the storage medium realize the functions of the embodiments mentioned above, and the storage medium in which the program codes have been stored constructs the invention. As a storage medium for supplying such program codes, for example, a floppy (registered trademark) disk, a hard disk, an optical disk, a magnetooptical disk, or the like can be used. Or, a CD-ROM, CD-R, a magnetic tape, a non-volatile memory card, a ROM, or the like can be also used.

Not only a case where a computer executes the read-out program codes, so that the functions of the embodiments mentioned above are realized but also a case where an OS (Operating System) or the like which is operating in the computer executes a part or all of the actual processings on the basis of instructions of the program codes, and the functions of the embodiments mentioned above are realized by those processings is incorporated.

Further, the program codes read out of the storage medium may be written into a memory equipped for a function expanding board inserted in the computer or for a function expanding unit connected to the computer. A case where, after that, a CPU or the like provided for the function expanding board or the function expanding unit executes a part or all of the actual processings on the basis of the instructions of the program codes, and the functions of the embodiments mentioned above are realized by those processings is also incorporated.

INDUSTRIAL APPLICABILITY

The image processing apparatus can be applied to processings of an image signal.

While the present invention has been described with reference to the exemplary embodiments it is to be understood that the present invention is not limited to the disclosed exemplary embodiments. The scope of the following claims is to be accorded the broadcast interpretation so as to encompass all such modifications and equivalent structures and functions.

This application claims the benefit of Japanese Patent Application No. 2009-279528, filed Dec. 9, 2009, which is hereby incorporated by reference herein in its entirety.

The invention claimed is:
1. An image processing apparatus comprising:
an input unit configured to input an output of an image pickup element having ordinary pixels arranged in a horizontal direction and a vertical direction and functional pixels arranged discretely between the ordinary pixels;

a first estimating unit configured to perform a gain correction operation to an output of a functional pixel, thereby estimating an image signal at a position of the functional pixel;

a second estimating unit configured to select a plurality of reference pixels from the ordinary pixels around the functional pixel and estimate the image signal at the position of the functional pixel on the basis of outputs of the plurality of selected reference pixels; and a determining unit configured to determine the output of the image signal at the position of the functional pixel on the basis of an output of the first estimating unit and from one or a plurality of estimation results which are obtained by the second estimating unit on the basis of combinations of the plurality of reference pixels.

2. The image processing apparatus according to claim 1, wherein the determining unit determines the output of the image signal at the position of the functional pixel in accordance with whether or not a difference between the image signal at the position of the functional pixel and the estimation result obtained by the first estimating unit falls within a predetermined value or less.

3. The image processing apparatus according to claim 2, wherein for any one of the plurality of estimation results which are obtained by the second estimating unit in accordance with the combinations of the plurality of selected reference pixels, if the difference between the image signal at the position of the functional pixel and the estimation result obtained by the first estimating unit does not fall within the predetermined value or less, the determining unit sets the estimation result obtained by the first estimating unit or an estimation result obtained by a weighted-addition of the estimation results obtained by the first and second estimating units, as the image signal at the position of the functional pixel.

4. The image processing apparatus according to claim 1, wherein the determining unit sets the estimation result which is closest to the estimation result obtained by the first estimating unit among the plurality of estimation results which are obtained by the second estimating unit in accordance with the combinations of the plurality of reference pixels, as the image signal at the position of the functional pixel.

5. The image processing apparatus according to claim 1, further comprising a defective pixel discriminating unit configured to discriminate whether or not the ordinary pixel or the functional pixel is a defective pixel, wherein the determining unit sets one of the estimation results which are obtained by the first and second estimating units as the image signal at the position of the functional pixel in accordance with a discrimination result of the defective pixel discriminating unit.

6. The image processing apparatus according to claim 1, further comprising:

a defective pixel discriminating unit configured to discriminate whether or not the plurality of reference pixels includes a defective pixel; and a reference pixel selecting unit configured to select a combination of the reference pixels in accordance with a discrimination result of the defective pixel discriminating unit.

7. The image processing apparatus according to claim 1, wherein the image pickup element is formed by two-dimensionally arranging a plurality of pixels, on a Bayer array unit basis, the Bayer array being constructed by three kinds of pixels which are sensitive to red, green, and blue, and the image pickup element has the functional pixels arranged discretely in the pixel arrays.

8. The image processing apparatus according to claim 7, wherein the functional pixel is arranged at the position corresponding to the pixel which is sensitive to green in the pixel array of the image pickup element.

9. The image processing apparatus according to claim 1, wherein the functional pixel receives image light through an optical system and outputs a signal that indicates a focus adjustment state of the optical system by a pupil division method.

10. The image processing apparatus according to claim 9, wherein the functional pixel receives image light for a pupil having a size which is equal to or larger than half of that of the ordinary pixel.

11. A control method of an image pickup apparatus having ordinary pixels arranged in a horizontal direction and a vertical direction and functional pixels arranged discretely between the ordinary pixels, comprising:

a first estimating step of performing a gain correction operation to an output of a functional pixel, thereby estimating an image signal at a position of the functional pixel;

a second estimating step of selecting a plurality of reference pixels from the ordinary pixels around the functional pixel and estimating the image signal at the position of the functional pixel on the basis of outputs of the plurality of selected reference pixels; and a determining step of determining the output of the image signal at the position of the functional pixel on the basis of an output in the first estimating step and one or a plurality of estimation results which are obtained in the second estimating step on the basis of combinations of the plurality of selected reference pixels.

12. A non-transitory computer-readable storage medium storing program code for allowing a computer to execute a control method of an image pickup apparatus having ordinary pixels arranged in a horizontal direction and a vertical direction and functional pixels arranged discretely between the ordinary pixels, wherein the control method comprises:

a step of reading out outputs of the ordinary pixels and the functional pixels from the image pickup apparatus;

a first estimating step of performing a gain correction operation to an output of a functional pixel, thereby estimating an image signal at a position of the functional pixel;

a second estimating step of selecting a plurality of reference pixels from the ordinary pixels around the functional pixel and estimating the image signal at the position of the functional pixel on the basis of outputs of the plurality of selected reference pixels; and a determining step of determining the output of the image signal at the position of the functional pixel on the basis of an output in the first estimating step and one or a plurality of estimation results which are obtained in the second estimating step on the basis of combinations of the plurality of selected reference pixels.

13. The image processing apparatus according to claim 1, wherein the second estimating unit generates at least one interpolation signal of the image signal estimated by the first estimating unit, by using the plurality of selected reference signals to estimate the output the image signal at the position of the functional pixel, and wherein the determining unit determines whether to use the generated interpolation signal as the output of the image signal at the position of the functional pixel, on the basis of the output of the first estimating unit.

14. The image processing apparatus according to claim 1, wherein the determining unit compares the output of the first estimating unit with the at least one generated interpolation signal to determine whether to use the generated interpolation signal as the output of the image signal at the position of the functional pixel, on the basis of a comparison result.

* * * * *